US012647835B2

(12) United States Patent
Gradus et al.

(10) Patent No.: US 12,647,835 B2
(45) Date of Patent: Jun. 2, 2026

(54) ACCESS NETWORK BIT RATE RECOMMENDATION FOR VoLTE CODEC CHANGE USING DYNAMIC VoLTE ALLOCATION

(71) Applicant: Parallel Wireless, Inc., Nashua, NH (US)

(72) Inventors: Nimrod Gradus, Givatayim (IL); Ido Shaked, Alfei Menashe (IL); Benjamin Abramovsky, Petah Tiqwa (IL)

(73) Assignee: Parallel Wireless, Inc., Nashua, NH (US)

( * ) Notice: Subject to any disclaimer, the term of this patent is extended or adjusted under 35 U.S.C. 154(b) by 455 days.

(21) Appl. No.: 17/850,419

(22) Filed: Jun. 27, 2022

(65) Prior Publication Data

US 2022/0417800 A1    Dec. 29, 2022

Related U.S. Application Data

(60) Provisional application No. 63/214,966, filed on Jun. 25, 2021.

(51) Int. Cl.
| | |
|---|---|
| *H04W 28/24* | (2009.01) |
| *H04L 5/00* | (2006.01) |
| *H04W 28/08* | (2023.01) |

(52) U.S. Cl.
CPC ........... *H04W 28/24* (2013.01); *H04L 5/0064* (2013.01); *H04W 28/0967* (2020.05)

(58) Field of Classification Search
CPC . H04W 28/24; H04W 28/0967; H04W 28/22; H04W 88/181; H04L 5/0064; H04L 1/0014; H04L 1/0015; H04L 1/0003; H04L 1/0009
See application file for complete search history.

(56) References Cited

U.S. PATENT DOCUMENTS

| | | | | |
|---|---|---|---|---|
| 2012/0320745 A1* | 12/2012 | Shi | ........................ | H04L 47/805 370/230 |
| 2014/0241243 A1* | 8/2014 | Singh | ........................ | H04L 1/08 370/328 |
| 2016/0286435 A1* | 9/2016 | Zhang | ................... | H04W 76/00 |
| 2018/0049058 A1* | 2/2018 | Faronius | ................ | H04L 47/24 |
| 2018/0262540 A1* | 9/2018 | Karimli | .............. | H04L 65/1083 |
| 2019/0373511 A1* | 12/2019 | Oyman | ................ | H04W 76/27 |

(Continued)

OTHER PUBLICATIONS

"Universal Mobile Telecommunications System (UMTS); LTE; IP Multimedia Subsystem (IMS); Multimedia telephony; Media handling and interaction", (3GPP TS 26.114 version 14.4.0 Release 14), Jul. 2017.

*Primary Examiner* — Margaret G Webb
*Assistant Examiner* — Frank E Donado
(74) *Attorney, Agent, or Firm* — Michael Y. Saji

(57) ABSTRACT

A method, system and computer readable medium for providing access network bit rate recommendation for Voice over Long Term Evolution (VoLTE) Coder Decoder (CODEC) change using dynamic VoLTE allocation is presented. In one embodiment a method includes determining, by an eNodeB, if Transmit Time Intervals (TTI) bundling is configured for a User Equipment (UE); and when TTI bundling is not configured, then sending an Access Network Bitrate Recommendation (ANBR) Medium Access Control (MAC) SE for VoLTE CODEC decrease.

8 Claims, 6 Drawing Sheets

100

Determine whether TTI bundling is configured for a UE — 101

If no ANBR MAC CE, trigger for CODEC decrease — 102

Determine whether next CODEC can be supported by the TTI bundling limitations of ITBS/RBs allocation of UE — 103

Send ANBR MAC CE for VoLTE CODEC increase — 104

Use DVA algorithm for CODEC change monitoring — 105

(56)         References Cited

U.S. PATENT DOCUMENTS

2020/0153972  A1*   5/2020   Leung  ............... H04W 36/0022
2021/0176013  A1*   6/2021   Ali  ........................ H04L 1/1812
2022/0394549  A1   12/2022   Gradus et al.

* cited by examiner

101

Determine whether TTI bundling is configured for a UE

102

If no ANBR MAC CE, trigger for CODEC decrease

103

Determine whether next CODEC can be supported by the TTI bundling limitations of ITBS/RBs allocation of UE

104

Send ANBR MAC CE for VoLTE CODEC increase

105

Use DVA algorithm for CODEC change monitoring

100

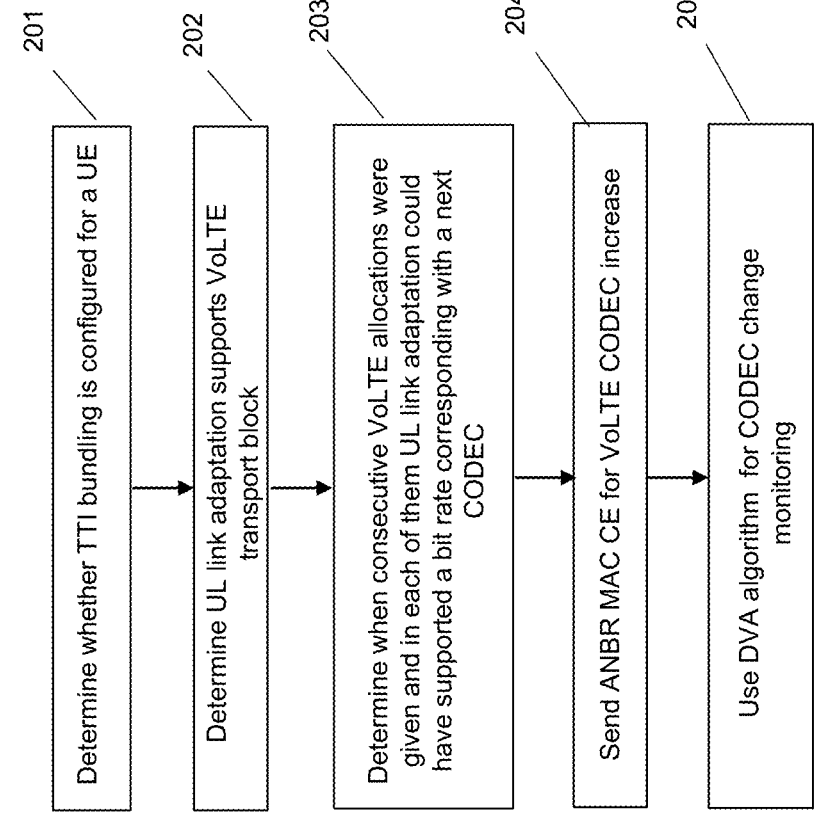

201 — Determine whether TTI bundling is configured for a UE

202 — Determine UL link adaptation supports VoLTE transport block

203 — Determine when consecutive VoLTE allocations were given and in each of them UL link adaptation could have supported a bit rate corresponding with a next CODEC 204 — Send ANBR MAC CE for VoLTE CODEC increase 205 — Use DVA algorithm for CODEC change monitoring

Determine whether TTI bundling is configured for a UE

302

When UL link adaptation cannot support VoLTE transport block and margin, and RLC segmentation would need more than a predetermined number of segments

303

Send ANBR MAC CE for VoLTE CODEC decrease

304

Use DVA algorithm for CODEC change monitoring

300

ACCESS NETWORK BIT RATE RECOMMENDATION FOR VoLTE CODEC CHANGE USING DYNAMIC VoLTE ALLOCATION

CROSS-REFERENCE TO RELATED APPLICATIONS

This application claims priority under 35 U.S.C. § 119(e) to U.S. Provisional Pat. App. No. 63/214,966, filed Jun. 25, 2021, titled "Access Network Bit Rate Recommendation for VoLTE CODEC Change Using Dynamic VoLTE Allocation" which is hereby incorporated by reference in its entirety for all purposes. This application hereby incorporates by reference, for all purposes, each of the following U.S. Patent Application Publications in their entirety: US20170013513A1; US20170026845A1; US20170055186A1; US20170070436A1; US20170077979A1; US20170019375A1; US20170111482A1; US20170048710A1; US20170127409A1; US20170064621A1; US20170202006A1; US20170238278A1; US20170171828A1; US20170181119A1; US20170273134A1; US20170272330A1; US20170208560A1; US20170288813A1; US20170295510A1; US20170303163A1; and US20170257133A1. This application also hereby incorporates by reference U.S. Pat. No. 8,879,416, "Heterogeneous Mesh Network and Multi-RAT Node Used Therein," filed May 8, 2013; U.S. Pat. No. 9,113,352, "Heterogeneous Self-Organizing Network for Access and Backhaul," filed Sep. 12, 2013; U.S. Pat. No. 8,867,418, "Methods of Incorporating an Ad Hoc Cellular Network Into a Fixed Cellular Network," filed Feb. 18, 2014; U.S. patent application Ser. No. 14/034,915, "Dynamic Multi-Access Wireless Network Virtualization," filed Sep. 24, 2013; U.S. patent application Ser. No. 14/289,821, "Method of Connecting Security Gateway to Mesh Network," filed May 29, 2014; U.S. patent application Ser. No. 14/500,989, "Adjusting Transmit Power Across a Network," filed Sep. 29, 2014; U.S. patent application Ser. No. 14/506,587, "Multicast and Broadcast Services Over a Mesh Network," filed Oct. 3, 2014; U.S. patent application Ser. No. 14/510,074, "Parameter Optimization and Event Prediction Based on Cell Heuristics," filed Oct. 8, 2014, U.S. patent application Ser. No. 14/642,544, "Federated X2 Gateway," filed Mar. 9, 2015, and U.S. patent application Ser. No. 14/936,267, "Self-Calibrating and Self-Adjusting Network," filed Nov. 9, 2015; U.S. patent application Ser. No. 15/607,425, "End-to-End Prioritization for Mobile Base Station," filed May 26, 2017; U.S. patent application Ser. No. 15/803,737, "Traffic Shaping and End-to-End Prioritization," filed Nov. 27, 2017, each in its entirety for all purposes, respectively. This document also hereby incorporates by reference U.S. Pat. Nos. 9,107,092, 8,867,418, and 9,232,547 in their entirety. This document also hereby incorporates by reference U.S. patent application Ser. No. 14/822,839, U.S. patent application Ser. No. 15/828,427, U.S. Pat. App. Pub. Nos. US20170273134A1, US20170127409A1 in their entirety.

BACKGROUND

VoLTE QOS is a primary concern in LTE and many methods were devised for increasing the VoLTE performance, especially for cell edge users. Two of the most popular features are, TTI bundling and RLC segmentation. In TTI bundling (defined in LTE release 8 and 12), the eNB can allow UE operating at the cell's edge to do fast HARQ transmissions while minimizing the control overhead, allowing an increase in the voice session mean opinion score (MOS) and the VoLTE QOS in general. RLC segmentation is a method that allows the eNB to split a packet into segments, when that packet cannot be allocated due to limitation of the UE's channel conditions. In LTE release 14, the ANBR MAC CE was introduced for the purpose of bit rate recommendation to be sent by the eNB to the UE. Such a feature can be used to affect the decrease and increase of the UE's voice CODEC upon an ongoing VoLTE session and therefore, has the potential to increase MOS and the VoLTE range (in DB), as other LTE features do, e.g., TTI bundling and RLC segmentation.

SUMMARY

Access Network Bit Rate recommendation (ANBR) is a LTE release 14 MAC control element (CE) which can be used to increase or decrease the UE's used voice CODEC. Triggering of ANBR needs to be carefully designed to a gain an increase in MOS while other VoLTE enhanced features such as, TTI bundling and RLC segmentation, are also working. In this invention, we propose the algorithm for defining the ANBR trigger points while taking advantage of our Dynamic Volte Allocation devised algorithm to fully benefit from ANBR.

In one example a method for providing access network bit rate recommendation for VoLTE CODEC change using dynamic VoLTE allocation includes determining by an eNodeB, if TTI bundling is disabled; determining, by the eNodeB, an increase or decrease of CODEC when TTI bundling is disabled; determining, by the eNodeB, if TTI bundling is enabled; and determining, by the eNodeB, an increase or decrease of CODEC when TTI bundling is enabled.

BRIEF DESCRIPTION OF THE DRAWINGS

FIG. 2 is a second flow diagram of an ANBR triggering mechanism, in accordance with some embodiments.

DETAILED DESCRIPTION

Figure 1:
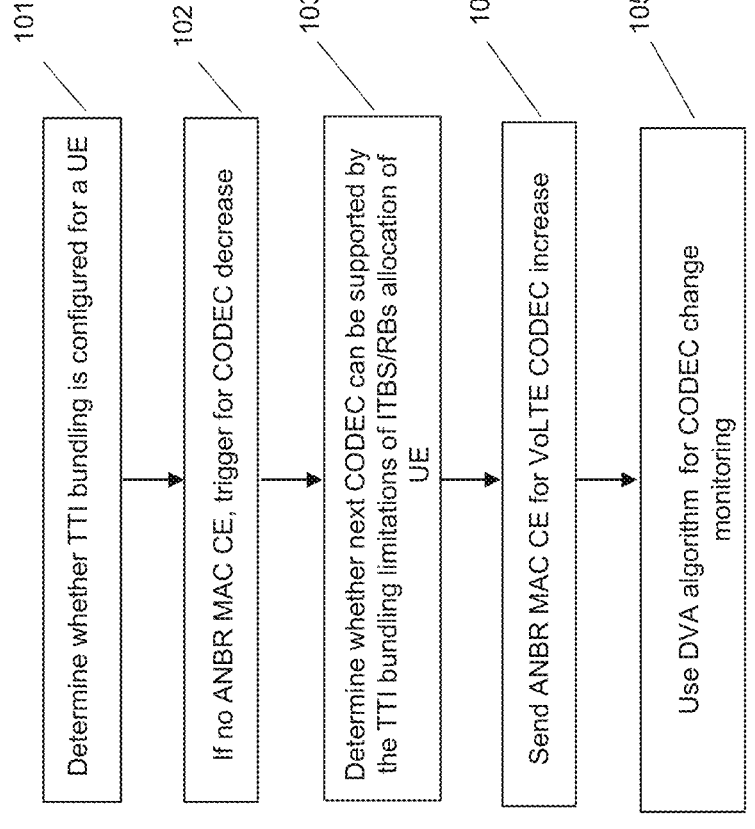
FIG. 1 is a first flow diagram of an ANBR triggering mechanism, in accordance with some embodiments.

While the description refers to VoLTE over 4G, it should be appreciated that similar concepts apply to VoLTE over 5G or its equivalents. The purpose of the eNB by triggering ANBR is to decrease and increase the CODEC used by the UE, however, a corresponding algorithm that takes into consideration other VoLTE enhancement features, as TTI bundling and RLC segmentation, is important for the ANBR to perform well. Also, the ANBR MAC CE, doesn't trigger any confirmation to the recommended bit rate change and therefore, the eNB cannot know that the UE changed his CODEC to the corresponding bit rate.

US 12,647,835 B2

3
Solution to Problem

Our solution comprises of our Dynamic Volte Allocation (DVA) algorithm, (Dynamic Volte Allocation—Invention), which allows us to interpret the UE's VoLTE CODEC from the VoLTE downlink packets coming in to the eNB buffer, with a simple calculation. With such ability, we can make sure that the eNB is aware of any CODEC change due to an ANBR. Following is the ANBR triggering algorithm, indicating when to trigger an increase or decrease of the voice CODEC, when taking into consideration TTI bundling and RLC segmentation that might work in the system.

ANBR MAC CE is triggered by the eNB in the following scenarios, RLC Segmentation is assumed always enabled and if TTI Bundling is activated, RLC Segmentation is also activated.

TTI Bundling is disabled. Decrease of CODEC. LA can't allocate the corresponding VoLTE allocation transport block (TB)+Margin_Decrease_ANBR and RLC Segmentation would need more than ANBR_RLC_Segments.

Where Margin_Decrease_ANBR is a predefined number of bits and ANBR_RLC_Segments is the number of segments RLC segmentation needs to split the required VoLTE TB allocation in the VoLTE periodicity.

Increase of CODEC, ANBR_Threshold_Increase consecutive VoLTE periods were initiated, where in each VoLTE period, the maximal bit rate that could have been allocated to the UE can accommodate an increase in CODEC, as follows, If VoLTE allocation RLC segmented in VoLTE period, $$\left( \sum_{i=0}^{ANBR\_RLC\_Segments} TB(ULLA)_i \right) < Alloc\_size(VoLTE\_Codec + 1)$$

Else,

TB(ULLA)<Alloc_size(VoLTE_Codec+1)

Where, TB(ULLA) is the TBS that can be allocated by the uplink link adaptation (ULLA) and power control with the current MCS and the maximal allowed RBs which can be allocated in the current UE's channel condition. Alloc_size (VoLTE_CODEC+1) is the VoLTE allocation size when using the next CODEC mode. CODEC isn't already the maximum CODEC, as indicated by VoLTE_CODEC. VoLTE_CODEC is the CODEC the UE uses, as calculated by the DVA algorithm.

TTI Bundling is enabled. Decrease of CODEC. LA can't allocate the corresponding VoLTE allocation TB+Margin_Decrease_ANBR and RLC Segmentation would need more than ANBR_RLC_Segments. TTI Bundling cannot be configured for UE for any reason, i.e., load, UE capabilities and channel conditions Increase of CODEC. CODEC isn't already the maximum CODEC, as indicated by VoLTE_CODEC. TTI bundling not configured for UE, same as Increase CODEC in 1.2.

TTI bundling configured for UE, If VoLTE_CODEC+1, i.e., the next CODEC, can be allocated, as per the TTI bundling limitations.

Figure 3:
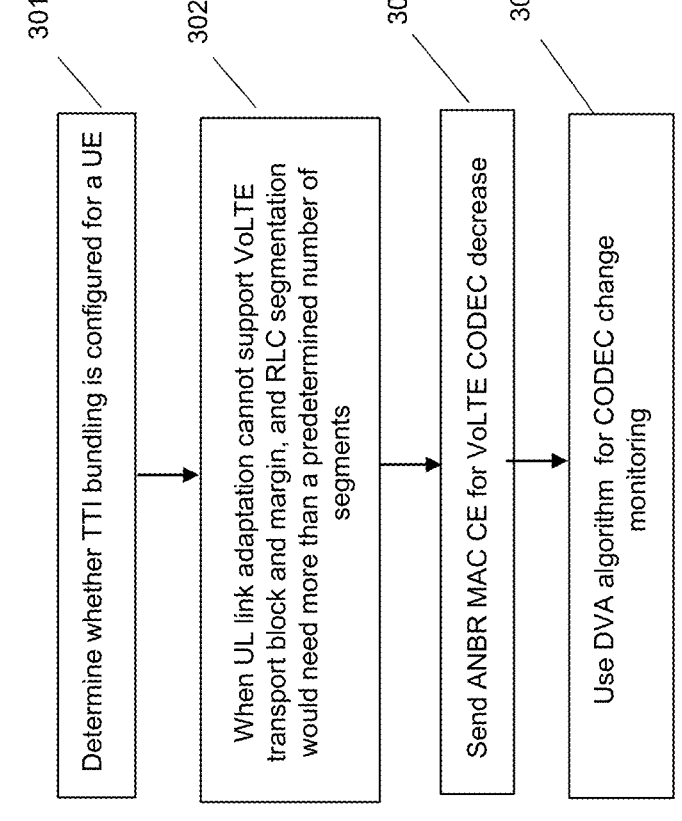
FIG. 3 is a third flow diagram of an ANBR triggering mechanism, in accordance with some embodiments.

A flow diagram of the ANBR triggering mechanism is shown in FIGS. 1-3.

FIG. 1 is a flow diagram showing a first part 100 of ANBR triggering. The process starts with processing block 101 which discloses determining whether TTI bundling is configured for a UE. Processing block 102 shows if no ANBR MAC CE, trigger for CODEC decrease.
Processing block 103 recites determining whether next CODEC can be supported by the TTI bundling limitations of ITBS/RBs allocation of UE. Processing block 104 discloses sending ANBR MAC CE for VoLTE CODEC increase. Processing block 105 shows using DVA algorithm for CODEC change monitoring.

FIG. 2 is a flow diagram showing a second part 200 of ANBR triggering. The process starts with processing block 201 which discloses determining whether TTI bundling is configured for a UE. Processing block 202 shows determining UL link adaptation supports VoLTE transport block.

Processing block 203 recites determining when consecutive VoLTE allocations were given and in each of them UL link adaptation could have supported a bit rate corresponding with a next CODEC. Processing block 204 discloses send ANBR MAC CE for VoLTE CODEC increase. Processing block 205 shows using DVA algorithm for CODEC change monitoring FIG. 3 is a flow diagram showing a third part 300 of ANBR triggering. The process starts with processing block 301 which discloses determining whether TTI bundling is configured for a UE. Processing block 302 shows when UL link adaptation cannot support VoLTE transport block and margin, and RLC segmentation would need more than a predetermined number of segments.

Figure 4:
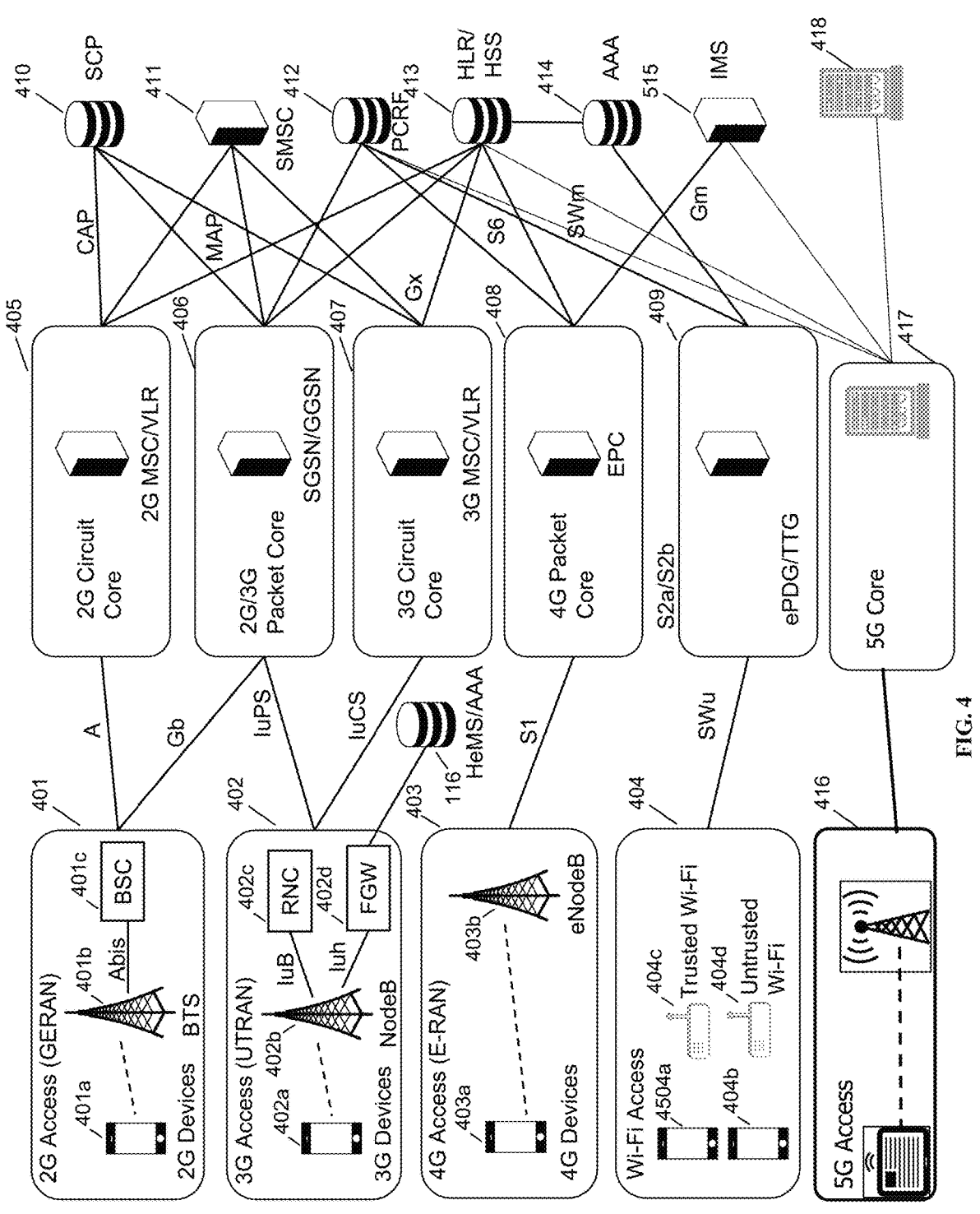
FIG. 4 is a schematic network architecture diagram for 3G and other-G prior art networks.

Processing block 303 recites sending ANBR MAC CE for VoLTE CODEC decrease. Processing block 205 shows using DVA algorithm for CODEC change monitoring FIG. 4 is a schematic network architecture diagram for 3G and other-G prior art networks. The diagram shows a plurality of "Gs," including 2G, 3G, 4G, 5G and Wi-Fi. 2G is represented by GERAN 401, which includes a 2G device 401a, BTS 401b, and BSC 401c. 3G is represented by UTRAN 402, which includes a 3G UE 402a, nodeB 402b, RNC 402c, and femto gateway (FGW, which in 3GPP namespace is also known as a Home nodeB Gateway or HNBGW) 402d. 4G is represented by EUTRAN or E-RAN 403, which includes an LTE UE 403a and LTE eNodeB 403b. Wi-Fi is represented by Wi-Fi access network 404, which includes a trusted Wi-Fi access point 404c and an untrusted Wi-Fi access point 404d. The Wi-Fi devices 404a and 404b may access either AP 404c or 404d. In the current network architecture, each "G" has a core network. 2G circuit core network 405 includes a 2G MSC/VLR; 2G/3G packet core network 406 includes an SGSN/GGSN (for EDGE or UMTS packet traffic); 3G circuit core 407 includes a 3G MSC/VLR; 4G circuit core 408 includes an evolved packet core (EPC); and in some embodiments the Wi-Fi access network may be connected via an ePDG/TTG using S2a/S2b. Each of these nodes are connected via a number of different protocols and interfaces, as shown, to other, non-"G"-specific network nodes, such as the SCP 430, the SMSC 431, PCRF 432, HLR/HSS 433, Authentication, Authorization, and Accounting server (AAA) 434, and IP Multimedia Subsystem (IMS) 435. An HeMS/AAA 436 is present in some cases for use by the 3G UTRAN. The diagram is used to indicate schematically the basic functions of each network as known to one of skill in the art, and is not intended to be exhaustive. For example, 5G core 417 is shown using a single interface to 5G access 416, although in some cases 5G access can be supported using dual connectivity or via a non-standalone deployment architecture.

Noteworthy is that the RANs 401, 402, 403, 404 and 436 rely on specialized core networks 405, 406, 407, 408, 409, 437 but share essential management databases 430, 431, 432, 433, 434, 435, 438. More specifically, for the 2G GERAN, a BSC 401c is required for Abis compatibility with BTS 401*b*, while for the 3G UTRAN, an RNC 402*c* is required for Iub compatibility and an FGW 402*d* is required for Iuh compatibility. These core network functions are separate because each RAT uses different methods and techniques. On the right side of the diagram are disparate functions that are shared by each of the separate RAT core networks. These shared functions include, e.g., PCRF policy functions, AAA authentication functions, and the like. Letters on the lines indicate well-defined interfaces and protocols for communication between the identified nodes.

The system may include 5G equipment. 5G networks are digital cellular networks, in which the service area covered by providers is divided into a collection of small geographical areas called cells. Analog signals representing sounds and images are digitized in the phone, converted by an analog to digital converter and transmitted as a stream of bits. All the 5G wireless devices in a cell communicate by radio waves with a local antenna array and low power automated transceiver (transmitter and receiver) in the cell, over frequency channels assigned by the transceiver from a common pool of frequencies, which are reused in geographically separated cells. The local antennas are connected with the telephone network and the Internet by a high bandwidth optical fiber or wireless backhaul connection.

5G uses millimeter waves which have shorter range than microwaves, therefore the cells are limited to smaller size. Millimeter wave antennas are smaller than the large antennas used in previous cellular networks. They are only a few inches (several centimeters) long. Another technique used for increasing the data rate is massive MIMO (multiple-input multiple-output). Each cell will have multiple antennas communicating with the wireless device, received by multiple antennas in the device, thus multiple bitstreams of data will be transmitted simultaneously, in parallel. In a technique called beamforming the base station computer will continuously calculate the best route for radio waves to reach each wireless device, and will organize multiple antennas to work together as phased arrays to create beams of millimeter waves to reach the device.

Figure 5:
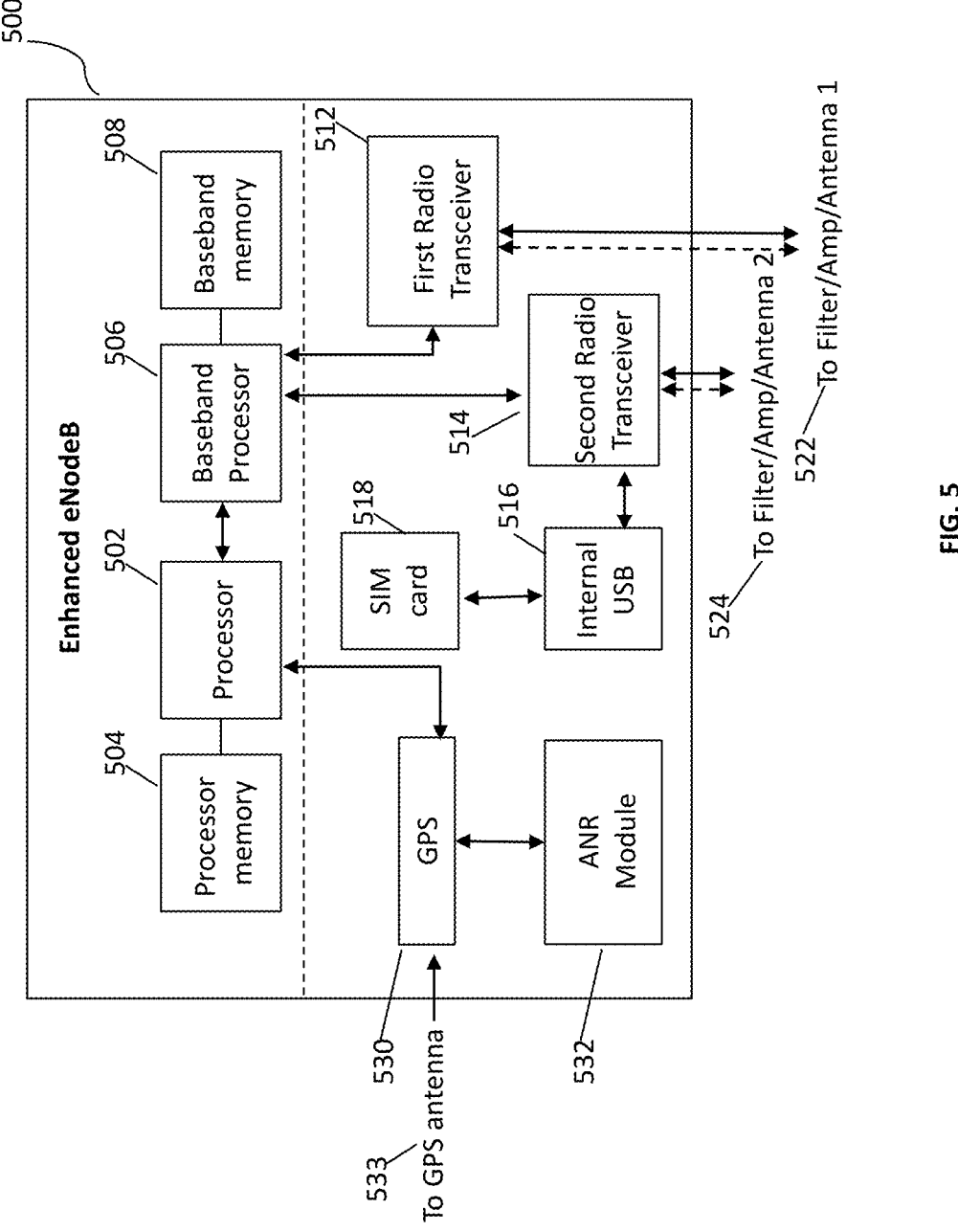
FIG. 5 is an enhanced eNodeB for performing the methods described herein, in accordance with some embodiments.

FIG. 5 is an enhanced eNodeB for performing the methods described herein, in accordance with some embodiments. eNodeB 500 may include processor 502, processor memory 504 in communication with the processor, baseband processor 506, and baseband processor memory 508 in communication with the baseband processor. Mesh network node 500 may also include first radio transceiver 512 and second radio transceiver 514, internal universal serial bus (USB) port 516, and subscriber information module card (SIM card) 518 coupled to USB port 516. In some embodiments, the second radio transceiver 514 itself may be coupled to USB port 516, and communications from the baseband processor may be passed through USB port 516. The second radio transceiver may be used for wirelessly backhauling eNodeB 500.

Processor 502 and baseband processor 506 are in communication with one another. Processor 502 may perform routing functions, and may determine if/when a switch in network configuration is needed. Baseband processor 506 may generate and receive radio signals for both radio transceivers 512 and 514, based on instructions from processor 502. In some embodiments, processors 502 and 506 may be on the same physical logic board. In other embodiments, they may be on separate logic boards.

Processor 502 may identify the appropriate network configuration, and may perform routing of packets from one network interface to another accordingly. Processor 502 may use memory 504, in particular to store a routing table to be used for routing packets. Baseband processor 506 may perform operations to generate the radio frequency signals for transmission or retransmission by both transceivers 510 and 512. Baseband processor 506 may also perform operations to decode signals received by transceivers 512 and 514. Baseband processor 506 may use memory 508 to perform these tasks.

The first radio transceiver 512 may be a radio transceiver capable of providing LTE eNodeB functionality, and may be capable of higher power and multi-channel OFDMA. The second radio transceiver 514 may be a radio transceiver capable of providing LTE UE functionality. Both transceivers 512 and 514 may be capable of receiving and transmitting on one or more LTE bands. In some embodiments, either or both of transceivers 512 and 514 may be capable of providing both LTE eNodeB and LTE UE functionality. Transceiver 512 may be coupled to processor 502 via a Peripheral Component Interconnect-Express (PCI-E) bus, and/or via a daughtercard. As transceiver 514 is for providing LTE UE functionality, in effect emulating a user equipment, it may be connected via the same or different PCI-E bus, or by a USB bus, and may also be coupled to SIM card 518. First transceiver 512 may be coupled to first radio frequency (RF) chain (filter, amplifier, antenna) 522, and second transceiver 514 may be coupled to second RF chain (filter, amplifier, antenna) 524.

SIM card 518 may provide information required for authenticating the simulated UE to the evolved packet core (EPC). When no access to an operator EPC is available, a local EPC may be used, or another local EPC on the network may be used. This information may be stored within the SIM card, and may include one or more of an international mobile equipment identity (IMEI), international mobile subscriber identity (IMSI), or other parameter needed to identify a UE. Special parameters may also be stored in the SIM card or provided by the processor during processing to identify to a target eNodeB that device 500 is not an ordinary UE but instead is a special UE for providing backhaul to device 500.

Wired backhaul or wireless backhaul may be used. Wired backhaul may be an Ethernet-based backhaul (including Gigabit Ethernet), or a fiber-optic backhaul connection, or a cable-based backhaul connection, in some embodiments. Additionally, wireless backhaul may be provided in addition to wireless transceivers 512 and 514, which may be Wi-Fi 802.11a/b/g/n/ac/ad/ah, Bluetooth, ZigBee, microwave (including line-of-sight microwave), or another wireless backhaul connection. Any of the wired and wireless connections described herein may be used flexibly for either access (providing a network connection to UEs) or backhaul (providing a mesh link or providing a link to a gateway or core network), according to identified network conditions and needs, and may be under the control of processor 502 for reconfiguration.

A GPS module 530 may also be included, and may be in communication with a GPS antenna 532 for providing GPS coordinates, as described herein. When mounted in a vehicle, the GPS antenna may be located on the exterior of the vehicle pointing upward, for receiving signals from overhead without being blocked by the bulk of the vehicle or the skin of the vehicle. Automatic neighbor relations (ANR) module 532 may also be present and may run on processor 502 or on another processor, or may be located within another device, according to the methods and procedures described herein.

Other elements and/or modules may also be included, such as a home eNodeB, a local gateway (LGW), a self-organizing network (SON) module, or another module.

Additional radio amplifiers, radio transceivers and/or wired network connections may also be included.

Figure 6:
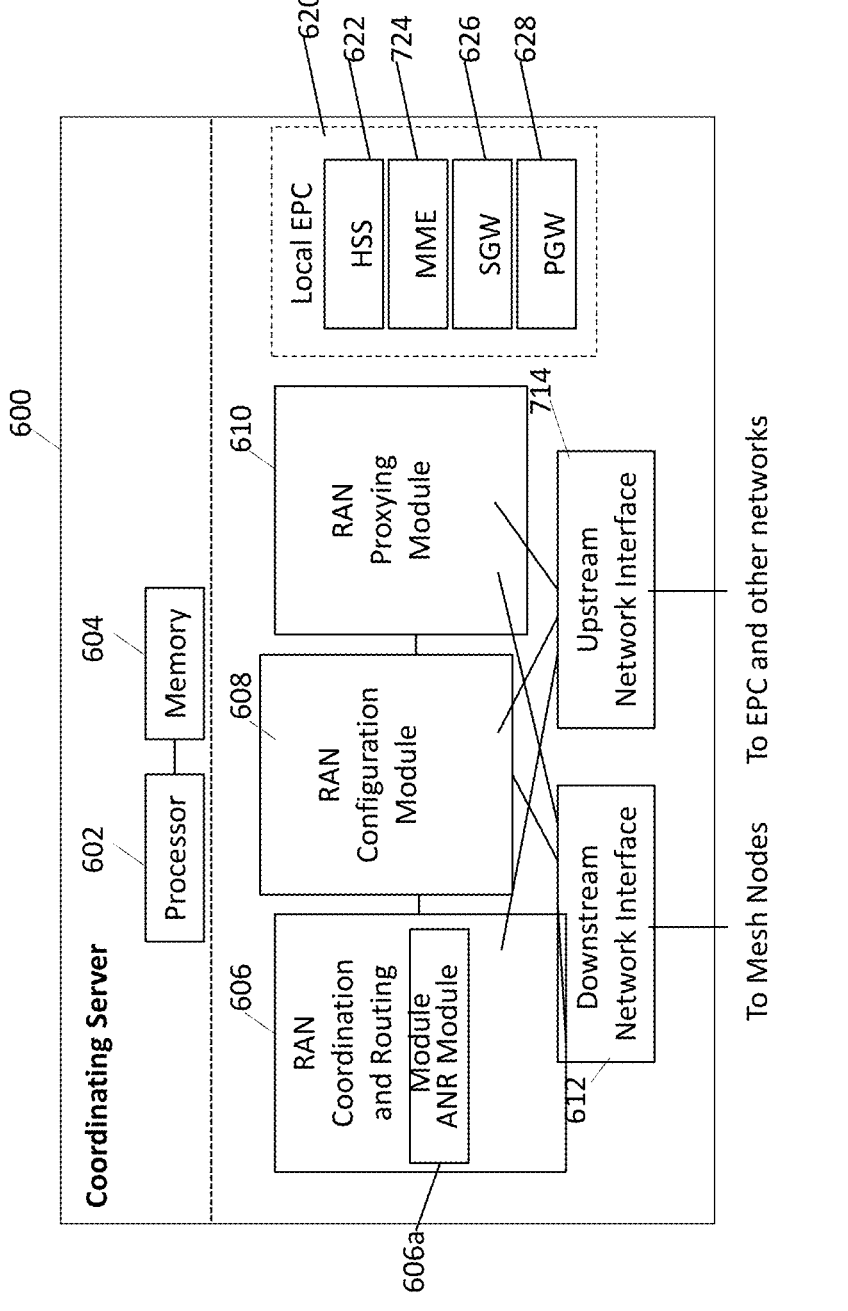
FIG. 6 is a coordinating server for providing services and performing methods as described herein, in accordance with some embodiments.

FIG. 6 is a coordinating server for providing services and performing methods as described herein, in accordance with some embodiments. Coordinating server 600 includes processor 602 and memory 604, which are configured to provide the functions described herein. Also present are radio access network coordination/routing (RAN Coordination and routing) module 606, including ANR module 606a, RAN configuration module 608, and RAN proxying module 610. The ANR module 606a may perform the ANR tracking, PCI disambiguation, ECGI requesting, and GPS coalescing and tracking as described herein, in coordination with RAN coordination module 606 (e.g., for requesting ECGIs, etc.). In some embodiments, coordinating server 600 may coordinate multiple RANs using coordination module 606. In some embodiments, coordination server may also provide proxying, routing virtualization and RAN virtualization, via modules 610 and 608. In some embodiments, a downstream network interface 612 is provided for interfacing with the RANs, which may be a radio interface (e.g., LTE), and an upstream network interface 614 is provided for interfacing with the core network, which may be either a radio interface (e.g., LTE) or a wired interface (e.g., Ethernet).

Coordinator 600 includes local evolved packet core (EPC) module 620, for authenticating users, storing and caching priority profile information, and performing other EPC-dependent functions when no backhaul link is available. Local EPC 620 may include local HSS 622, local MME 624, local SGW 626, and local PGW 628, as well as other modules. Local EPC 620 may incorporate these modules as software modules, processes, or containers. Local EPC 620 may alternatively incorporate these modules as a small number of monolithic software processes. Modules 606, 608, 610 and local EPC 620 may each run on processor 602 or on another processor, or may be located within another device.

In any of the scenarios described herein, where processing may be performed at the cell, the processing may also be performed in coordination with a cloud coordination server. A mesh node may be an eNodeB. An eNodeB may be in communication with the cloud coordination server via an X2 protocol connection, or another connection. The eNodeB may perform inter-cell coordination via the cloud communication server when other cells are in communication with the cloud coordination server. The eNodeB may communicate with the cloud coordination server to determine whether the UE has the ability to support a handover to Wi-Fi, e.g., in a heterogeneous network.

Although the methods above are described as separate embodiments, one of skill in the art would understand that it would be possible and desirable to combine several of the above methods into a single embodiment, or to combine disparate methods into a single embodiment. For example, all of the above methods could be combined. In the scenarios where multiple embodiments are described, the methods could be combined in sequential order, or in various orders, as necessary.

Although the above systems and methods for providing interference mitigation are described in reference to the Long Term Evolution (LTE) standard, one of skill in the art would understand that these systems and methods could be adapted for use with other wireless standards or versions thereof. The inventors have understood and appreciated that the present disclosure could be used in conjunction with various network architectures and technologies. Wherever a 4G technology is described, the inventors have understood that other RATs have similar equivalents, such as a gNodeB for 5G equivalent of eNB. Wherever an MME is described, the MME could be a 3G RNC or a 5G AMF/SMF. Additionally, wherever an MME is described, any other node in the core network could be managed in much the same way or in an equivalent or analogous way, for example, multiple connections to 4G EPC PGWs or SGWs, or any other node for any other RAT, could be periodically evaluated for health and otherwise monitored, and the other aspects of the present disclosure could be made to apply, in a way that would be understood by one having skill in the art.

Additionally, the inventors have understood and appreciated that it is advantageous to perform certain functions at a coordination server, such as the Parallel Wireless HetNet Gateway, which performs virtualization of the RAN towards the core and vice versa, so that the core functions may be statefully proxied through the coordination server to enable the RAN to have reduced complexity. Therefore, at least four scenarios are described: (1) the selection of an MME or core node at the base station; (2) the selection of an MME or core node at a coordinating server such as a virtual radio network controller gateway (VRNCGW); (3) the selection of an MME or core node at the base station that is connected to a 5G-capable core network (either a 5G core network in a 5G standalone configuration, or a 4G core network in 5G non-standalone configuration); (4) the selection of an MME or core node at a coordinating server that is connected to a 5G-capable core network (either 5G SA or NSA). In some embodiments, the core network RAT is obscured or virtualized towards the RAN such that the coordination server and not the base station is performing the functions described herein, e.g., the health management functions, to ensure that the RAN is always connected to an appropriate core network node. Different protocols other than S1AP, or the same protocol, could be used, in some embodiments.

In some embodiments, the base stations described herein may support Wi-Fi air interfaces, which may include one or more of IEEE 802.11a/b/g/n/ac/af/p/h. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols, or other air interfaces.

In some embodiments, the software needed for implementing the methods and procedures described herein may be implemented in a high level procedural or an object-oriented language such as C, C++, C#, Python, Java, or Perl. The software may also be implemented in assembly language if desired. Packet processing implemented in a network device can include any processing determined by the context. For example, packet processing may involve high-level data link control (HDLC) framing, header compression, and/or encryption. In some embodiments, software that, when executed, causes a device to perform the methods described herein may be stored on a computer-readable medium such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

In some embodiments, the radio transceivers described herein may be base stations compatible with a Long Term Evolution (LTE) radio transmission protocol or air interface. The LTE-compatible base stations may be eNodeBs. In addition to supporting the LTE protocol, the base stations may also support other air interfaces, such as UMTS/HSPA, CDMA/CDMA2000, GSM/EDGE, GPRS, EVDO, 2G, 3G, 5G, TDD, or other air interfaces used for mobile telephony.

In some embodiments, the base stations described herein may support Wi-Fi air interfaces, which may include one or more of IEEE 802.11a/b/g/n/ac/af/p/h. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols, or other air interfaces.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, wireless network topology can also apply to wired networks, optical networks, and the like. The methods may apply to LTE-compatible networks, to UMTS-compatible networks, or to networks for additional protocols that utilize radio frequency data transmission. Various components in the devices described herein may be added, removed, split across different devices, combined onto a single device, or substituted with those having the same or similar functionality.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Features of one embodiment may be used in another embodiment.

The invention claimed is:

1. A method for providing access network bit rate recommendation for Voice over Long Term Evolution (VoLTE) Coder Decoder (CODEC) change using dynamic VoLTE allocation (DVA), the method comprising:
 determining, by an eNodeB, if Transmit Time Interval (TTI) bundling is configured for a User Equipment (UE);
 when TTI bundling is not configured, then determining when RLC segmentation would need more than a predetermined number of segments;
 when TTI bundling is not configured, then sending an Access Network Bitrate Recommendation (ANBR) Medium Access Control (MAC) control element (CE) for VoLTE CODEC decrease; and
 when TTI bundling is not configured, then determining whether UL link adaptation supports VoLTE transport block, wherein, when the UL link adaptation cannot support the VoLTE transport block, and the RLC segmentation would need more than the predetermined number of segments, the ANBR is triggered to send the ANBR MAC CE for the VoLTE CODEC decrease.

2. The method of claim 1, further comprising when TTI bundling is configured then determining whether a next CODEC can be supported by TTI bundling limitations of resource block (RB) allocation of UE, and sending ANBR MAC CE for VoLTE CODEC increase.

3. The method of claim 1, further comprising determining when consecutive VoLTE allocations were given and in each of them UL link adaptation could have supported a bit rate corresponding with a next CODEC, and sending ANBR MAC CE for VoLTE CODEC increase.

4. The method of claim 1, further comprising using a DVA algorithm for CODEC change monitoring.

5. A non-transitory computer-readable medium containing instructions for providing access network bit rate recommendation for Voice over Long Term Evolution (VoLTE) Coder Decoder (CODEC) change using dynamic VoLTE allocation (DVA) which, when executed, cause a system to perform steps comprising:
 determining, by an eNodeB, if Transmit Time Interval (TTI) bundling is configured for a User Equipment (UE);
 when TTI bundling is not configured, then determining when RLC segmentation would need more than a predetermined number of segments;
 when TTI bundling is not configured, then sending an Access Network Bitrate Recommendation (ANBR) Medium Access Control (MAC) control element (CE) for VoLTE CODEC decrease; and
 when TTI bundling is not configured, then determining whether UL link adaptation supports VoLTE transport block, wherein, when the UL link adaptation cannot support the VoLTE transport block, and the RLC segmentation would need more than the predetermined number of segments, the ANBR is triggered to send the ANBR MAC CE for the VoLTE CODEC decrease.

6. The non-transitory computer-readable medium of claim 5, further comprising instructions wherein when TTI bundling is configured then determining whether a next CODEC can be supported by TTI bundling limitations of resource block allocation of UE, and sending ANBR MAC CE for VoLTE CODEC increase.

7. The non-transitory computer-readable medium of claim 5, further comprising instructions wherein when TTI bundling is not configured then determining when consecutive VoLTE allocations were given and in each of them UL link adaptation could have supported a bit rate corresponding with a next CODEC, and sending ANBR MAC CE for VoLTE CODEC increase.

8. The non-transitory computer-readable medium of claim 5, further comprising instructions for using a DVA algorithm for CODEC change monitoring.

* * * * *